(12) United States Patent
Gao et al.

(10) Patent No.: US 11,402,530 B2
(45) Date of Patent: Aug. 2, 2022

(54) METHOD FOR ACQUIRING CONVERTED WAVE, ELECTRONIC DEVICE AND READABLE STORAGE MEDIUM

(71) Applicant: PetroChina Company Limited, Beijing (CN)

(72) Inventors: Jianhu Gao, Beijing (CN); Shengjun Li, Beijing (CN); Xueshan Yong, Beijing (CN); Shian Shen, Beijing (CN); Bingyang Liu, Beijing (CN); Jinyong Gui, Beijing (CN)

(73) Assignee: PetroChina Company Limited, Beijing (CN)

( * ) Notice: Subject to any disclaimer, the term of this patent is extended or adjusted under 35 U.S.C. 154(b) by 637 days.

(21) Appl. No.: 16/416,646

(22) Filed: May 20, 2019

(65) Prior Publication Data

US 2020/0103543 A1 Apr. 2, 2020

(30) Foreign Application Priority Data

Sep. 30, 2018 (CN) .......................... 201811159983.8

(51) Int. Cl.
*G01V 1/32* (2006.01)
*G01V 1/30* (2006.01)

(52) U.S. Cl.
CPC ................ *G01V 1/32* (2013.01); *G01V 1/307* (2013.01); *G01V 2210/632* (2013.01)

(58) Field of Classification Search
CPC .......... G01V 1/32; G01V 1/307; G01V 1/286; G01V 1/28; G01V 2210/632
See application file for complete search history.

(56) References Cited

U.S. PATENT DOCUMENTS

2004/0254733 A1  12/2004  Basaki et al.
2014/0324354 A1  10/2014  Al-Shuhail et al.

FOREIGN PATENT DOCUMENTS

| CN | 101915938 A | 12/2010 |
| CN | 103217707 A | 7/2013 |
| CN | 103257361 A | 8/2013 |
| CN | 103576197 A | 2/2014 |

(Continued)

OTHER PUBLICATIONS

K. A. Innanen, Anelastic P-Wave, S-Wave and Converted-Wave AVO Approximations, Jun. 4-7, 2012, 74th EAGE Conference & Exhibition Incorporating SPE EUROPEC 2012, 5 pp. (Year: 2012).*

(Continued)

*Primary Examiner* — Toan M Le
(74) *Attorney, Agent, or Firm* — Michael Best & Friedrich LLP

(57) ABSTRACT

The embodiments of the present application disclose a method for acquiring a converted wave, an electronic device, and a readable storage medium, wherein the method for acquiring a converted wave comprises: acquiring a relational expression between a P-wave reflection coefficient and an incident angle by Zoeppritz equation; simplifying the relational expression between the P-wave reflection coefficient and the incident angle; calculating a derivative for the simplified relational expression between the P-wave reflection coefficient and the incident angle, to obtain an expression of a wave to be converted; correcting parameters in the expression of the wave to be converted to obtain a converted wave.

15 Claims, 3 Drawing Sheets

(56) References Cited

FOREIGN PATENT DOCUMENTS

| | | | |
|---|---|---|---|
| CN | 104216016 A | 12/2014 |
| CN | 104597490 A | 5/2015 |
| CN | 105445785 A | 3/2016 |
| CN | 105607118 A | 5/2016 |
| CN | 106226811 A | 12/2016 |
| CN | 106226815 A | 12/2016 |
| CN | 106324666 A | 1/2017 |
| CN | 106443777 A | 2/2017 |
| CN | 107179545 A | 9/2017 |
| WO | 2014165219 A2 | 10/2014 |

OTHER PUBLICATIONS

Ramos et al., "Useful approximations for converted-wave AVO," Geophysics, Dec. 31, 2001, 66(6):1721-1734.
Xianhong et al., "Application of background deviation distance method in AVO crossplot analysis," The 11th hubei petroleum society excellent academic papers selection meeting proceedings, Dec. 31, 2004, 133-137 (English abstract included).
Zhengping et al., "Coal seam gas content prediction based on seismic multi-attributes analysis in Heshun block, Qinshui Basin," Geophysical Prospecting for Petroleum, Mar. 31, 2015, 54(2):226-233 (English abstract included).
Chinese Patent Office Action and Search Report for Application No. 201811159983.8 dated Oct. 24, 2019 (14 pages, English translation included).
Wang et al., "Study on Converted Wave Processing Method", Oil Geophysical Prospecting, vol. 43 Supplement 2, 2008, pp. 146-149.
He et al., "Common Conversion Point Gathering and Time-Variant Static Correction", Marine Geology & Qua Ternary Geology,vol. 26, No. 6, Dec. 2006, pp. 139-142.
Gong et al., "An Improved Method for P-P and P-SV Wave Time Matching", Oil Geophysical Prospecting, vol. 47 No. 5, 2012, pp. 698-703.
Chinese Search Report dated Sep. 18, 2018.

* cited by examiner

METHOD FOR ACQUIRING CONVERTED WAVE, ELECTRONIC DEVICE AND READABLE STORAGE MEDIUM

CROSS REFERENCES TO RELATED APPLICATIONS

The present invention contains subject matter related to Chinese Patent Application No.: 201811159983.8, filed Sep. 30, 2018, of which the entire contents are hereby incorporated by reference in the present application

TECHNICAL FIELD

The present application relates to the technical field of oil and gas field exploration, and in particular to a method for acquiring a converted wave, an electronic device, and a readable storage medium.

BACKGROUND ART

At present, the seismic exploration technology has become an indispensable and important means for oil and gas exploration. For a long time, due to the limitations of technology and cost, the seismic exploration is actually mainly based on a P-wave exploration. The seismic wave field data obtained by this method is not comprehensive enough to meet the technical requirements of the current complex oil and gas resource exploration. Moreover, the seismic interpretation also has strong multiplicity, which restricts the exploration and development of oil and gas to a certain extent.

The development of the converted wave seismic exploration technology began in the 1970s. This method can comprehensively utilize the information of the P-wave, the S-wave and the converted wave to carry out fine exploration of the oil and gas bearing regions, which can improve the exploration accuracy, effectively reduce the multiplicity of the P-wave exploration technology, and make the oil and gas predictions more accurately.

As the increasing requirement for exploration target and the development of the multi-wave and multi-component technology, the multi-wave seismic exploration and the information extraction have attracted more and more attention. However, due to the reasons such as a high acquisition cost and a low signal-to-noise ratio of the multi-wave and multi-component, the development of the multi-wave and multi-component technology is restricted, and the rich information contained in the converted wave seismic data cannot be effectively utilized.

SUMMARY OF THE APPLICATION

An objective of the embodiments of the present application is to provide a method for acquiring a converted wave, an electronic device, and a readable storage medium, which solve the technical problem of how to effectively acquire a converted wave while saving the exploration cost.

In order to achieve the above object, the embodiments of the present application provide a method for acquiring a converted wave, comprising:

acquiring a relational expression between a P-wave reflection coefficient and an incident angle by Zoeppritz equation;

simplifying the relational expression between the P-wave reflection coefficient and the incident angle;

calculating a derivative for the simplified relational expression between the P-wave reflection coefficient and the incident angle, to obtain an expression of a wave to be converted;

correcting parameters in the expression of the wave to be converted to obtain a converted wave.

In order to achieve the above object, the embodiments of the present application provide an electronic device, comprising a memory, a processor, and a computer program stored in the memory and can run on the processor, wherein when executing the computer program, the processor implements a method for acquiring a converted wave, comprising:

acquiring a relational expression between a P-wave reflection coefficient and an incident angle by Zoeppritz equation;

simplifying the relational expression between the P-wave reflection coefficient and the incident angle;

calculating a derivative for the simplified relational expression between the P-wave reflection coefficient and the incident angle, to obtain an expression of a wave to be converted;

correcting parameters in the expression of the wave to be converted to obtain a converted wave.

In order to achieve the above object, the embodiments of the present application provide a readable storage medium on which a computer program is stored, wherein when being executed, the computer program implements the following steps of a method for acquiring a converted wave:

acquiring a relational expression between a P-wave reflection coefficient and an incident angle by Zoeppritz equation;

simplifying the relational expression between the P-wave reflection coefficient and the incident angle;

calculating a derivative for the simplified relational expression between the P-wave reflection coefficient and the incident angle, to obtain an expression of a wave to be converted;

correcting parameters in the expression of the wave to be converted to obtain a converted wave.

As can be seen from the above content, being compared with the prior arts, the technical solution acquires the converted wave information by converting the seismic P-wave gather information, which is a new converted wave acquisition solution. Through the technical solution, the exploration cost can be saved, and the effective converted wave information can be obtained, thereby providing a data basis for the subsequent works such as a joint inversion of P-wave and S-wave. Through a comparative analysis, it shows that this technical solution has a higher accuracy and obvious effects.

BRIEF DESCRIPTION OF THE DRAWINGS

In order to more clearly explain the technical solutions in the embodiments of the present application or in the prior arts, the drawings to be used in the description of the embodiments or the prior arts will be briefly introduced as follows. Obviously, the drawings in the following description just illustrate some embodiments of the present application, and those skilled in the art can obtain other drawings from them without paying any creative effort.

DETAILED DESCRIPTION OF THE PREFERRED EMBODIMENTS

Figure 1:
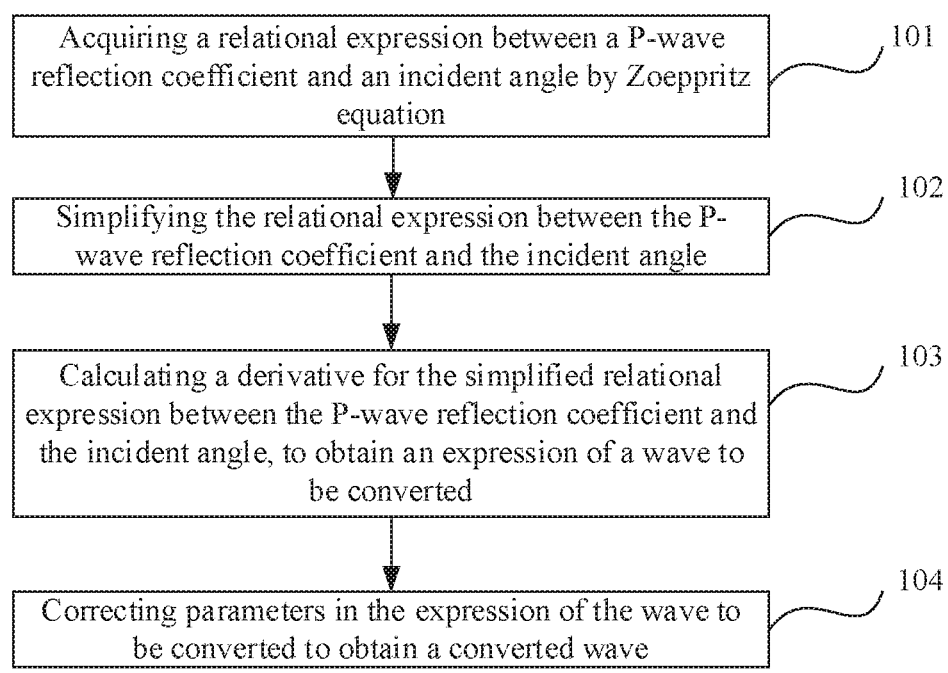
FIG. 1 is a flowchart of a method for acquiring a converted wave provided by an embodiment of the present application.

Next, the technical solutions in embodiments of the present disclosure will be clearly and completely described with reference to the drawings. The exemplary embodiments of the present disclosure and their various features and advantageous details will be more completely explained with reference to the nonrestrictive exemplary embodiments as illustrated in the drawings and detailed in the following description. It should be noted that the features illustrated in the drawings are not necessarily drawn to scale. The present disclosure omits the description of the known materials, components, and process technologies, so as not to obscure the exemplary embodiments of the present disclosure. The examples given are only intended to facilitate understanding of the implementations of the exemplary embodiments of the present disclosure and to further enable those skilled in the art to implement the exemplary embodiments. Therefore, those examples should not be construed as limitations to the scope of the embodiments of the present disclosure.

Unless otherwise specifically defined, the technical or scientific terms used herein should have the ordinary meanings understood by those with ordinary skills in the field to which the present disclosure belongs. In various embodiments of the present disclosure, the same or similar reference numerals refer to the same or similar members.

In view of the problems in the utilization and calculation of the converted wave described in the section of the Background Art, many scholars have studied on the extraction of the converted wave information from the P-waves, focusing on the researches of internal relationships between the P-waves and S-waves, the roles of the P-waves and S-waves in fluid identification, the matching between the P-waves and S-waves, etc.

When the P-wave is incident on a reflection interface, the same kind of reflected P-wave and converted reflected wave are generated in an upper half space, and the same kind of transmitted wave and converted wave are generated in a lower half space. The German geophysicist Karl Zoeppritz proposed a Zoeppritz equation in 1919, which can accurately reflect a correlation between the P-wave and the converted wave, and also reflect a variation rule of AVO.

Shuey simplified the Zoeppritz equation. When the P-wave is incident on a reflection interface at certain angle, a relationship between a P-wave reflection coefficient and an incident angle can be obtained as:

$$Rp(\theta) \approx P + G \sin^2(\theta) + C \sin^2(\theta) tg^2(\theta) \quad (1)$$

wherein $\theta$ represents an incident angle, an intercept P represents an amplitude at a normal incidence, a slope G represents a change rate of a reflection amplitude versus an offset, C represents a parameter associated with the two sides of the reflection interface, and $Rp(\theta)$ represents a P-wave reflection coefficient. When the incident angle is small, such as 30°~40°, the third item in expression (1) can usually be ignored, and expression (1) is simplified into:

$$Rp(\theta) \approx P + G \sin^2(\theta) \quad (2)$$

Expression (2) is subjected to a derivation to obtain:

$$Rp'(\theta) \approx 2G \sin(\theta)\cos(\theta) = G \sin(2\theta) \quad (3)$$

wherein $$G = \frac{1}{2} \cdot \frac{\Delta\alpha}{\alpha} - 4 * \frac{\beta^2}{\alpha^2} \frac{\Delta\beta}{\beta} - 2 * \frac{\beta}{\alpha} \frac{\Delta\rho}{\rho};$$

$\alpha$ represents a P-wave velocity; $\beta$ represents an S-wave velocity; $\Delta\alpha$ represents an average value of the P-wave velocities on a reflection interface; $\rho$ represents a density; $\Delta\beta$ represents an average value of the S-wave velocities on the reflection interface; and $\Delta\rho$ represents an average value of the densities on two sides of the reflection interface.

Aki & Richard simplified the Zoeppritz equation. When the P-wave is incident on a reflection interface at certain angle, a relationship between a converted wave reflection coefficient and an incident angle can be obtained as:

$$Rps(\theta) \approx A \sin(\theta) + B \sin^3(\theta) \quad (4)$$

wherein A and B are parameters related to the P-wave velocity, the S-wave velocity and the density on the two sides of the reflection interface. $Rps(\theta)$ represents a converted wave reflection coefficient.

When the incident angle is small, such as 30°~40° the second item in expression (4) can usually be ignored, and expression (4) is simplified into:

$$Rps(\theta) \approx A \sin(\theta) \quad (5)$$

wherein $$A = \frac{1}{2}\left(1 + 2\frac{\beta}{\alpha}\right)\frac{\Delta\rho}{\rho} - 2\frac{\beta}{\alpha}\frac{\Delta\beta}{\beta};$$

$\alpha$ represents a P-wave velocity; $\beta$ represents an S-wave velocity; $\rho$ represents a density; $\Delta\beta$ represents an average value of the S-wave velocities on the reflection interface; and $\Delta\rho$ represents an average value of the densities on two sides of the reflection interface.

The comparison between expression (5) and expression (3) shows that they are highly consistent with each other in form, and the difference only lies in their anterior coefficients related to the elastic parameters on the two sides of the reflection interface, which can be solved by correcting the coefficient. Therefore, the relationship between the P-wave and the converted wave is established through such a conversion, and the converted wave can be acquired through a derivation of the P-wave. In the actual seismic exploration, the converted wave seismic data can be acquired by collecting the P-wave seismic data conventionally and making such an approximate conversion thereof, and then a joint application research of the P-waves and S-waves can be carried out, thereby saving the cost of the collection of the converted wave, and improving the exploration efficiency and the success rate greatly.

Based on the above description, FIG. 1 illustrates a flowchart of a method for acquiring a converted wave provided by an embodiment of the present application, wherein the method for acquiring a converted wave can be applied in a server. Specifically, the server may be a background service server capable of providing data processing. In this embodiment, the server may be an electronic device having the functions of data operation, storage and network interaction. The server may also be software running in the electronic device and providing supports for data processing, storage and network interaction. The number of the servers is not specifically limited in this embodiment. The server may be one server, several servers, or a server cluster formed by several servers. The method comprises:

step 101): acquiring a relational expression between a P-wave reflection coefficient and an incident angle by Zoeppritz equation;

step 102): simplifying the relational expression between the P-wave reflection coefficient and the incident angle;

step 103): calculating a derivative for the simplified relational expression between the P-wave reflection coefficient and the incident angle, to obtain an expression of a wave to be converted;

step 104): correcting parameters in the expression of the wave to be converted to obtain a converted wave.

In this step, a change rate of a reflection amplitude versus an offset, and the incident angle in the expression of the wave to be converted are corrected, so that a calculated value of a reflection coefficient of the wave to be converted is approximate to a theoretical value of a converted wave reflection coefficient.

In this embodiment, the relational expression between the P-wave reflection coefficient and the incident angle is determined by an amplitude at a normal incidence, a parameter associated with the two sides of a reflection interface, and a change rate of a reflection amplitude versus an offset, wherein the relational expression between the P-wave reflection coefficient and the incident angle is:

$$Rp(\theta) \approx P + G \sin^2(\theta) + C \sin^2(\theta) tg^2(\theta)$$

wherein θ represents an incident angle, an intercept P represents an amplitude at a normal incidence, a slope G represents a change rate of a reflection amplitude versus an offset, C represents a parameter associated with the two sides of the reflection interface, and Rp(θ) represents a P-wave reflection coefficient.

In this embodiment, the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface. The expression of the wave to be converted is:

$$Rp'(\theta) \approx 2G \sin(\theta)\cos(\theta) = G \sin(2\theta)$$

wherein $$G = \frac{1}{2} \cdot \frac{\Delta\alpha}{\alpha} - 4 * \frac{\beta^2}{\alpha^2} \frac{\Delta\beta}{\beta} - 2 * \frac{\beta}{\alpha} \frac{\Delta\rho}{\rho};$$

α represents a P-wave velocity; β represents an S-wave velocity; Δα represents an average value of the P-wave velocities on a reflection interface; ρ represents a density; Δβ represents an average value of the S-wave velocities on the reflection interface; and Δρ represents an average value of the densities on two sides of the reflection interface.

In order to verify the effectiveness of this technical solution, different models are designed to compare the obtained relationship between the amplitude and the incident angle with the AVO relationship of the converted wave described in the conventional technologies.

Firstly, a model with mudstone in an upper layer and gas bearing sandstone in a lower layer is designed. The model parameters are as follows.

Model 1: Mudstone-gas bearing sandstone interface

TABLE 1

|  | P-wave velocity | S-wave velocity | Density |
|---|---|---|---|
| Mudstone | 7190 | 3828 | 2.23 |
| Gas bearing sandstone | 9125 | 5460 | 1.67 |

Figure 2:
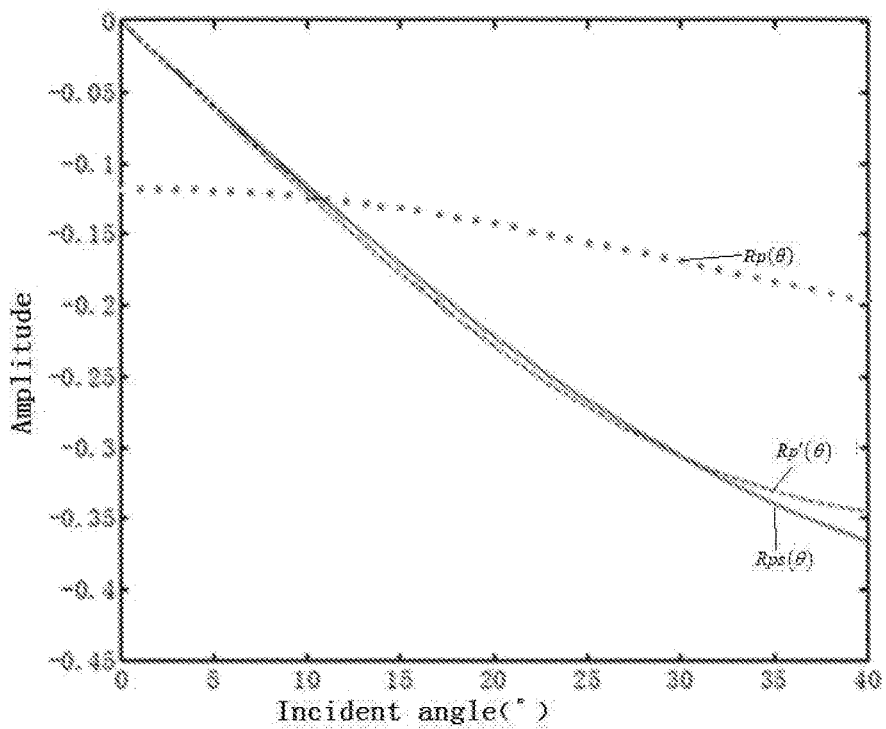
FIG. 2 is a curve chart illustrating a P-wave, a theoretical value of a converted wave, and a wave to be converted of Model 1 of the embodiment.

Using the parameters shown in Table 1, the P-wave reflection coefficient Rp(θ) is calculated with different incident angles by expression (2), the converted wave reflection coefficient Rps(θ) is calculated with different incident angles by expression (5), and the converted wave reflection coefficient is a theoretical value. The reflection coefficient Rp'(θ) of the wave to be converted is obtained by expression (3), and the results are shown in FIG. 2 after the coefficients are corrected. It can be seen that the results of the reflection coefficient Rp'(θ) of the wave to be converted and the theoretical value of converted wave reflection coefficient Rps(θ) are substantially the same.

Similarly, a model with shale in an upper layer and water bearing sandstone in a lower layer is designed. The model parameters are as follows.

Model 2: Shale-water bearing sandstone interface

TABLE 2

|  | P-wave velocity | S-wave velocity | Density |
|---|---|---|---|
| Shale | 7190 | 2684 | 2.16 |
| Water bearing sandstone | 7000 | 2820 | 2.11 |

Figure 3:
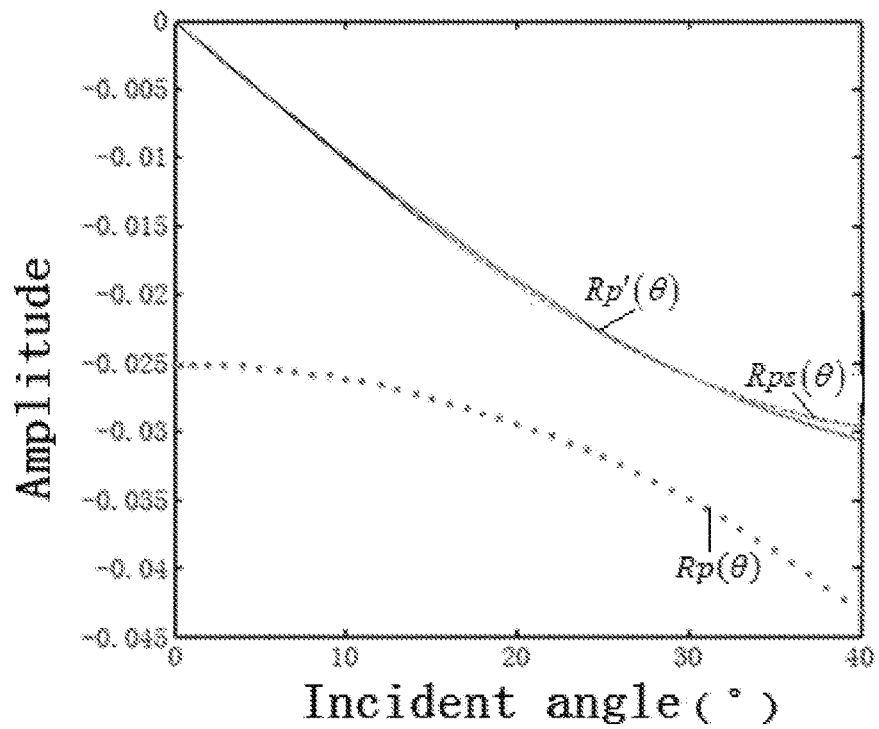
FIG. 3 is a curve chart illustrating a P-wave, a theoretical value of a converted wave, and a wave to be converted of Model 2 of the embodiment.

Using the parameters shown in Table 2, the P-wave reflection coefficient Rp(θ) is calculated with different incident angles by expression (2), the converted wave reflection coefficient Rps (θ) is calculated with different incident angles by expression (5), and the converted wave reflection coefficient is a theoretical value. The reflection coefficient Rp'(θ) of the wave to be converted is obtained by expression (3), and the results are shown in FIG. 3 after the coefficients are corrected. It can be seen that the results of the reflection coefficient Rp'(θ) of the wave to be converted and the theoretical value of the converted wave reflection coefficient Rps (θ) are substantially the same, which verifies that this type of model parameters are satisfied.

Similarly, a model with shale in an upper layer and gas bearing sandstone in a lower layer is designed. The model parameters are as follows.

Model 3: Shale-gas bearing sandstone interface

TABLE 3

|  | P-wave velocity | S-wave velocity | Density |
|---|---|---|---|
| Shale | 7190 | 2684 | 2.16 |
| Gas bearing sandstone | 5061 | 2956 | 1.88 |

Figure 4:
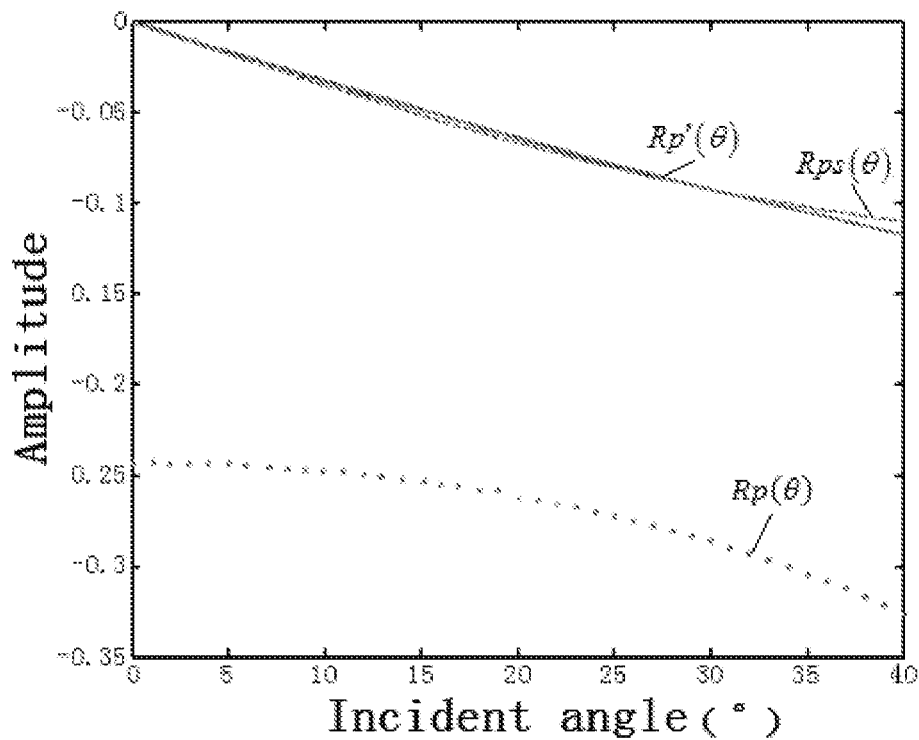
FIG. 4 is a curve chart illustrating a P-wave, a theoretical value of a converted wave, and a wave to be converted of Model 3 of the embodiment.

Using the parameters shown in Table 3, the P-wave reflection coefficient Rp(θ) is calculated with different incident angles by expression (2), the converted wave reflection coefficient Rps(θ) is calculated with different incident angles by expression (5), and the converted wave reflection coefficient is a theoretical value. The reflection coefficient Rp'(θ) of the wave to be converted is obtained by expression (3), and the results are shown in FIG. 4 after the coefficients are corrected. It can be seen that the results of the reflection coefficient Rp'(θ) of the wave to be converted and the theoretical values of the converted wave reflection coefficient Rps(θ) are substantially the same, which verifies that this type of model parameters are also satisfied, i.e., there is no problem with the applicability of the technical solution.

Figure 5:
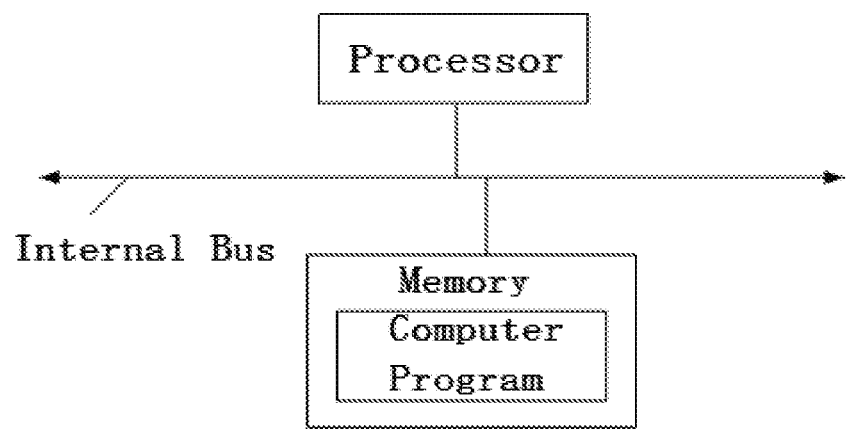
FIG. 5 is a schematic diagram of an electronic device provided by an embodiment of the present application.

FIG. 5 illustrates a schematic diagram of an electronic device provided by an embodiment of the present application, comprising a memory, a processor, and a computer program stored in the memory and can run on the processor, wherein when executing the computer program, the processor implements a method for acquiring a converted wave, comprising:

acquiring a relational expression between a P-wave reflection coefficient and an incident angle by Zoeppritz equation;

simplifying the relational expression between the P-wave reflection coefficient and the incident angle;

calculating a derivative for the simplified relational expression between the P-wave reflection coefficient and the incident angle, to obtain an expression of a wave to be converted;

correcting parameters in the expression of the wave to be converted to obtain a converted wave.

In one embodiment, the relational expression between the P-wave reflection coefficient and the incident angle is determined by an amplitude at a normal incidence, a parameter associated with the two sides of a reflection interface, and a change rate of a reflection amplitude versus an offset.

In one embodiment, the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface.

In one embodiment, correcting parameters in the expression of the wave to be converted comprises:

correcting a change rate of a reflection amplitude versus an offset, and the incident angle in the expression of the wave to be converted, so that a calculated value of a reflection coefficient of the wave to be converted is approximate to a theoretical value of a converted wave reflection coefficient.

In one embodiment, the incident angle has a range from 30° to 40°.

In the electronic device provided by the embodiment herein, the specific functions realized by the memory and the processor can be explained with reference to the previous embodiments, and achieve the technical effects thereof, thus, a detailed description is omitted here.

In this embodiment, the memory may include a physical device for storing information that is usually digitized and then stored in a medium using electric, magnetic, optical methods, or the like. The memory according to this embodiment may further include a device that stores information by means of electric energy, such as RAM and ROM; a device that stores information by means of magnetic energy, such as hard disk, floppy disk, magnetic tape, magnetic core memory, magnetic bubble memory and U disk; and a device that stores information optically, such as CD or DVD. Of course, there may be other forms of memories, such as a quantum memory, a graphene memory, etc.

In this embodiment, the processor may be implemented in any suitable manner. For example, the processor may take the form of, for example, a microprocessor or a processor with a computer readable medium storing computer readable program codes (e.g. software or firmware) executable by the (micro)processor, a logic gate, a switch, an Application Specific Integrated Circuit (ASIC), a programmable logic controller, or an embedded microcontroller.

The embodiments of the present application further provide a readable storage medium on which a computer program is stored, wherein when being executed, the computer program implements the following steps of a method for acquiring a converted wave:

acquiring a relational expression between a P-wave reflection coefficient and an incident angle by Zoeppritz equation;

simplifying the relational expression between the P-wave reflection coefficient and the incident angle;

calculating a derivative for the simplified relational expression between the P-wave reflection coefficient and the incident angle, to obtain an expression of a wave to be converted;

correcting parameters in the expression of the wave to be converted to obtain a converted wave.

In one embodiment, the relational expression between the P-wave reflection coefficient and the incident angle is determined by an amplitude at a normal incidence, a parameter associated with the two sides of a reflection interface, and a change rate of a reflection amplitude versus an offset.

In one embodiment, the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface.

In one embodiment, correcting parameters in the expression of the wave to be converted comprises:

correcting a change rate of a reflection amplitude versus an offset, and the incident angle in the expression of the wave to be converted, so that a calculated value of a reflection coefficient of the wave to be converted is approximate to a theoretical value of a converted wave reflection coefficient.

In one embodiment, the incident angle has a range from 30° to 40°.

The technical solution acquires the converted wave information by converting the seismic P-wave gather information, which is a new converted wave acquisition solution. Through the technical solution, the exploration cost can be saved, and the effective converted wave information can be obtained, thereby providing a data basis for the subsequent works such as a joint inversion of P-wave and S-wave. Through a comparative analysis, it shows that the technical solution has a higher accuracy and obvious effects.

In the 1990s, it is easy to distinguish whether a technical improvement is a hardware improvement (for example, an improvement to a circuit structure such as a diode, a transistor, a switch, etc.), or a software improvement (an improvement to a methodical flow). However, with the development of technologies, improvements to many methodical flows nowadays can be regarded as direct improvements to the hardware circuit structures. Almost all of the designers obtain the corresponding hardware circuit structures by programming the improved methodical flows into the hardware circuits. Therefore, it should not be deemed that an improvement to a methodical flow cannot be implemented with a hardware entity module. For example, a Programmable Logic Device (PLD) (e.g., Field Programmable Gate Array (FPGA)) is an integrated circuit having logical functions determined by user's programming of the device. The designer programs by himself to "integrate" a digital system onto a piece of PLD, without needing to design and manufacture the ASIC chip by the chip manufacturer. Moreover, at present, instead of manually manufacturing the integrated circuit chips, such programming is mostly implemented using software "logic compiler", which is similar to the software compiler used for program development, and the original codes to be compiled should be written in a specific programming language referred to as Hardware Description Language (HDL). There are many kinds of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc., and currently the most commonly used are Very-High-Speed Integrated Circuit Hardware Description Language (VHDL) and Verilog2. It should be apparent to those skilled in the art that a hardware circuit that implements a logic methodical flow can be easily obtained just by slightly logically programming the methodical flow into an integrated circuit with the aforementioned hardware description languages.

Those skilled in the art also know that, in addition to implementing the client and the server purely with computer-readable program codes, the client and the server can be allowed to realize the same functions in the form of, for example, a logic gate, a switch, an Application Specific Integrated Circuit (ASIC), a programmable logic controller, or an embedded microcontroller by logically programming the methodical steps. Therefore, the client and the server may be considered as hardware components, and the devices included therein for realizing various functions may also be regarded as structures within the hardware components. Alternatively, the devices for realizing various functions even may be deemed as both software modules that implement the methods and structures within the hardware components.

As can be seen from the descriptions of the above embodiments, those skilled in the art can clearly understand that the present application can be implemented by means of software plus a necessary universal hardware platform. Based on this understanding, the essence of the technical solution of the present application or the part making a contribution to the prior art can be embodied in the form of a computer software product, which may be stored in a storage medium, such as a ROM/RAM, a magnetic disk, an optical disk, etc., and include several instructions to enable a computer device (a personal computer, a server, a network device, etc.) to carry out the methods described in embodiments, or certain parts of the embodiments of the present application.

Each embodiment herein is described in a progressive manner. Each embodiment lays an emphasis on its difference from other embodiments, and the same or similar parts of various embodiments can refer to each other. In particular, embodiments of the client and the server may refer to the description of the forgoing method embodiment.

The present application may be described in the general context of the computer-executable instructions executed by a computer, such as program modules. Generally, the program modules include routines, programs, objects, components, data structures, etc. that perform particular tasks or realize particular abstract data types. The present application may also be practiced in distributed computing environments where tasks are performed by remote processing devices connected via a communication network. In a distributed computing environment, the program modules may be located in local and remote computer storage media including storage devices.

Although the present application are described by way of embodiments, those skilled in the art will understand that there are many modifications and changes to the present application without departing from the spirit of the present application, and it is intended that the appended claims include these modifications and changes without departing from the spirit of the present application.

The invention claimed is:

1. A method for acquiring a converted wave of a P-wave collected during seismic exploration, being applied in a server, comprising:

collecting the P-wave during the seismic exploration;

acquiring a relational expression between a P-wave reflection coefficient and an incident angle by Zoeppritz equation, wherein the relational expression between the P-wave reflection coefficient and the incident angle is:

$Rp(\theta) \approx P + G \sin^2(\theta) + C \sin^2(\theta) tg^2(\theta),$ wherein $tg(\theta) = \sin(\theta)/\cos(\theta)$; $\theta$ represents an incident angle, an intercept P represents an amplitude at a normal incidence, a slope G represents a change rate of a reflection amplitude versus an offset, C represents a parameter associated with the two sides of the reflection interface, and $Rp(\theta)$ represents a P-wave reflection coefficient;

simplifying the relational expression between the P-wave reflection coefficient and the incident angle;

calculating a derivative for the simplified relational expression between the P-wave reflection coefficient and the incident angle, to obtain an expression of a wave to be converted, wherein the expression of the wave to be converted is:

$Rp'(\theta) \approx 2G \sin(\theta)\cos(\theta) = G \sin(2\theta)$ wherein $$G = \frac{1}{2} \cdot \frac{\Delta\alpha}{\alpha} - 4 * \frac{\beta^2}{\alpha^2} \frac{\Delta\beta}{\beta} - 2 * \frac{\beta}{\alpha} \frac{\Delta\rho}{\rho};$$

$\alpha$ represents a P-wave velocity; $\beta$ represents an S-wave velocity; $\Delta\alpha$ represents an average value of the P-wave velocities on a reflection interface; $\rho$ represents a density; $\Delta\beta$ represents an average value of the S-wave velocities on the reflection interface; and $\Delta\rho$ represents an average value of the densities on two sides of the reflection interface;

correcting parameters in the expression of the wave to be converted to obtain the converted wave of the P-wave.

2. The method according to claim 1, wherein the relational expression between the P-wave reflection coefficient and the incident angle is determined by an amplitude at a normal incidence, a parameter associated with the two sides of a reflection interface, and a change rate of a reflection amplitude versus an offset.

3. The method according to claim 1, wherein the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface.

4. The method according to claim 1, wherein correcting parameters in the expression of the wave to be converted comprises:
correcting a change rate of a reflection amplitude versus an offset, and the incident angle in the expression of the wave to be converted, so that a calculated value of a reflection coefficient of the wave to be converted is approximate to a theoretical value of a converted wave reflection coefficient.

5. The method according to claim 1, wherein the incident angle has a range from 30° to 40°.

6. An electronic device, comprising a memory, a processor, and a computer program stored in the memory and can run on the processor, wherein when executing the computer program, the processor implements a method for acquiring a converted wave of a P-wave collected during seismic exploration, comprising:
collecting the P-wave during the seismic exploration;
acquiring a relational expression between a P-wave reflection coefficient and an incident angle by Zoeppritz equation, wherein the relational expression between the P-wave reflection coefficient and the incident angle is:

$Rp(\theta) \approx P + G \sin^2(\theta) + C \sin^2(\theta) tg^2(\theta)$, wherein $tg(\theta) = \sin(\theta)/\cos(\theta)$; $\theta$ represents an incident angle, an intercept P represents an amplitude at a normal incidence, a slope G represents a change rate of a reflection amplitude versus an offset, C represents a parameter associated with the two sides of the reflection interface, and $Rp(\theta)$ represents a P-wave reflection coefficient;
simplifying the relational expression between the P-wave reflection coefficient and the incident angle;
calculating a derivative for the simplified relational expression between the P-wave reflection coefficient and the incident angle, to obtain an expression of a wave to be converted, wherein the expression of the wave to be converted is:

$Rp'(\theta) \approx 2G \sin(\theta)\cos(\theta) = G \sin(2\theta)$ wherein $$G = \frac{1}{2} \cdot \frac{\Delta\alpha}{\alpha} - 4 * \frac{\beta^2}{\alpha^2} \frac{\Delta\beta}{\beta} - 2 * \frac{\beta}{\alpha} \frac{\Delta\rho}{\rho};$$

$\alpha$ represents a P-wave velocity; $\beta$ represents an S-wave velocity; $\Delta\alpha$ represents an average value of the P-wave velocities on a reflection interface; $\rho$ represents a density; $\Delta\beta$ represents an average value of the S-wave velocities on the reflection interface; and $\Delta\rho$ represents an average value of the densities on two sides of the reflection interface;
correcting parameters in the expression of the wave to be converted to obtain the converted wave of the P-wave.

7. The electronic device according to claim 6, wherein the relational expression between the P-wave reflection coefficient and the incident angle is determined by an amplitude at a normal incidence, a parameter associated with the two sides of a reflection interface, and a change rate of a reflection amplitude versus an offset.

8. The electronic device according to claim 6, wherein the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface.

9. The electronic device according to claim 6, wherein correcting parameters in the expression of the wave to be converted comprises:
correcting a change rate of a reflection amplitude versus an offset, and the incident angle in the expression of the wave to be converted, so that a calculated value of a reflection coefficient of the wave to be converted is approximate to a theoretical value of a converted wave reflection coefficient.

10. The electronic device according to claim 6, wherein the incident angle has a range from 30° to 40°.

11. A non-transitory readable storage medium on which a computer program is stored, wherein when being executed, the computer program implements the following steps of a method for acquiring a converted wave of a P-wave collected during seismic exploration:
collecting the P-wave during the seismic exploration;
acquiring a relational expression between a P-wave reflection coefficient and an incident angle by Zoeppritz equation, wherein the relational expression between the P-wave reflection coefficient and the incident angle is:

$Rp(\theta) \approx P + G \sin^2(\theta) + C \sin^2(\theta) tg^2(\theta)$, wherein $tg(\theta) = \sin(\theta)/\cos(\theta)$; $\theta$ represents an incident angle, an intercept P represents an amplitude at a normal incidence, a slope G represents a change rate of a reflection amplitude versus an offset, C represents a parameter associated with the two sides of the reflection interface, and $Rp(\theta)$ represents a P-wave reflection coefficient;
simplifying the relational expression between the P-wave reflection coefficient and the incident angle;
calculating a derivative for the simplified relational expression between the P-wave reflection coefficient and the incident angle, to obtain an expression of a wave to be converted, wherein the expression of the wave to be converted is:

$Rp'(\theta) \approx 2G \sin(\theta)\cos(\theta) = G \sin(2\theta)$ wherein $$G = \frac{1}{2} \cdot \frac{\Delta\alpha}{\alpha} - 4 * \frac{\beta^2}{\alpha^2} \frac{\Delta\beta}{\beta} - 2 * \frac{\beta}{\alpha} \frac{\Delta\rho}{\rho};$$

$\alpha$ represents a P-wave velocity; $\beta$ represents an S-wave velocity; $\Delta\alpha$ represents an average value of the P-wave velocities on a reflection interface; $\rho$ represents a density; $\Delta\beta$ represents an average value of the S-wave velocities on the reflection interface; and $\Delta\rho$ represents an average value of the densities on two sides of the reflection interface;
correcting parameters in the expression of the wave to be converted to obtain the converted wave of the P-wave.

12. The non-transitory readable storage medium according to claim 11, wherein the relational expression between the P-wave reflection coefficient and the incident angle is determined by an amplitude at a normal incidence, a parameter associated with the two sides of a reflection interface, and a change rate of a reflection amplitude versus an offset.

13. The non-transitory readable storage medium according to claim 11, wherein the expression of the wave to be converted is determined by a change rate of a reflection amplitude versus an offset, wherein the change rate of the reflection amplitude versus the offset is determined according to a P-wave velocity, an S-wave velocity, an average value of the P-wave velocities on a reflection interface, a density, an average value of the S-wave velocities on the reflection interface, and an average value of the densities on two sides of the reflection interface.

14. The non-transitory readable storage medium according to claim 11, wherein correcting parameters in the expression of the wave to be converted comprises:
  correcting a change rate of a reflection amplitude versus an offset, and the incident angle in the expression of the wave to be converted, so that a calculated value of a reflection coefficient of the wave to be converted is approximate to a theoretical value of a converted wave reflection coefficient.

15. The non-transitory readable storage medium according to claim 11, wherein the incident angle has a range from 30° to 40°.

* * * * *